United States Patent

[11] 3,621,230

| | | | |
|---|---|---|---|
| [72] | Inventor | Henry R. Dwight | |
| | | 220 Calhoun St., Charleston, S.C. 29401 | |
| [21] | Appl. No. | 10,731 | |
| [22] | Filed | Feb. 12, 1970 | |
| [45] | Patented | Nov. 16, 1971 | |

[54] HEADLAMP-MOUNTING MEANS
9 Claims, 13 Drawing Figs.

[52] U.S. Cl. ............................................. 240/7.1, 240/41.5
[51] Int. Cl. .............................................. B60q 1/00
[50] Field of Search .................................. 240/7.1, 41.5, 63, 61.5, 61.7, 61.8, 63, 41.6, 44

[56] References Cited
UNITED STATES PATENTS

| | | | | |
|---|---|---|---|---|
| 2,266,329 | 12/1941 | Mead et al. | | 240/41.5 |
| 2,504,327 | 4/1950 | Gross | | 240/41.6 |
| 2,826,682 | 3/1958 | Falge | | 240/41.5 |
| 2,868,961 | 1/1959 | Worden | | 240/41.5 |
| 2,911,522 | 11/1959 | Mears | | 240/41.6 |
| 2,911,524 | 11/1959 | Falge et al. | | 240/7.1 X |

Primary Examiner—Louis J. Capozi
Attorney—William H. Duffey

ABSTRACT: Adjustable headlamp-mounting apparatus for vehicles employing a pivotal stud and socket means in cooperation with a guide member to afford positive alignment of an intermediate support member which houses the headlamp. Adjusting screws engaging the intermediate support member act against the main mounting plate to change headlamp alignment through movement of the pivotal stud and socket means.

PATENTED NOV 16 1971 3,621,230

INVENTOR
HENRY R DWIGHT

BY T. Russell Foster
ATTORNEY

INVENTOR
HENRY R. DWIGHT
BY T. Russell Foster
ATTORNEY

HEADLAMP-MOUNTING MEANS

The present invention relates to headlamp-mounting means for automotive vehicles. More specifically it relates to a sealed beam headlamp-mounting assembly which affords improved attachment and positive, reliable adjustments for vertical and horizontal alignment.

For forward illumination of motor vehicles today, all glass-sealed beam headlamps are almost universally used. Sealed beam headlamp assemblies, broadly speaking, comprise a reflector, a lens, and a source of light hermetically sealed as a unit.

Conventional mounting devices for sealed beam automotive headlamps generally comprise a cup-shaped casing in which a ball member with means for attaching the sealed beam headlamp is adjustably mounted. The casing may be formed either as a separate stamping or may be formed integrally with a part of the body of the vehicle. The conventional mounting system is described in U.S. Pat. No. 2,266,329 to Mead et al. and it is broadly classified as a ball-and-socket type of universal joint.

For many years automobile manufacturers and supplying industries have expended continual research efforts to produce improved illumination forward of the vehicle and to reduce the glare therefrom to a minimum for occupants of oncoming vehicles. Despite many improvements made in sealed beam headlamp design from time to time, resulting in both increased illumination and decreased glare, due to the very common fault of incorrect alignment there is at all times a relatively large number of vehicles on which the headlamps produce one or both of two dangerous conditions, viz: (1) "overdriving the headlights," which exists when the stopping distance becomes greater than the seeing distance. This is almost always caused by headlamps which are aimed too low and/or too much to the left or the right; but it can also be caused by headlamps which are aimed too high. (2) Excessive glare for persons in oncoming vehicles which reduces their seeing distance and otherwise adversely affects their field of vision. This is caused by one or more headlamps which are aimed too high and/or far to the left.

In the mounting of headlamp units in modern automobiles, trucks and busses, it is necessary to provide adjustments which are used for setting the correct alignment of the unit commonly known as aiming, both vertically and horizontally. In conventional designs, this alignment is made possible by employing a ball-and-socket type of universal joint. The sealed beam unit itself, in combination with a member in which it is mounted, known as the mounting ring, constitutes the ball assembly of the joint, which is adjustably secured in a socket which is attached to or is integral with a part of the body or fender, there being a three-point contact between the ball-and-socket assembly members. One or more coil springs are provided which yieldingly hold the ball assembly in the socket; and adjusting means are included for turning the ball assembly vertically and horizontally in the socket.

It has been found that the ball-and-socket type of assembly described above is susceptible to change of alignment for a number of reasons, thus:

1. During the aligning process of a headlamp using the ball-and-socket type of mounting, unless the final turnings of both the vertical and horizontal adjusting screws are in a direction such that the tension of the coil spring is thereby increased, the impact created by the vehicle's wheels rolling over holes in the road, railroad tracks, etc. can cause the headlamp alignment to change.

2. Due to the inherent design of the ball-and-socket type of headlamp mounting, in which a coil spring pulls inwardly together the two members comprising the ball and socket on a three-point contact and simultaneously causes an outward pull by the flanges against the double-head adjusting screws, thereby creating a sort of five-point contact, and due to the necessary lack of precision in the mass production of some of the component parts of the system, in a relatively great number of instances after the headlamp has been correctly aligned, the headlamp-mounting ring assembly can be turned easily vertically and/or horizontally in the socket to an extent that will produce a dangerous change of alignment.

3. Due to the inherent design of the ball-and-socket type of headlamp mounting, in which a coil spring pulls inwardly together the two members comprising the ball and socket on a three-point contact and simultaneously causes an outward pull by the flanges against the double-head adjusting screws, thereby creating a sort of five-point contact, in many instances of the process of aligning headlamps, the turning of either one or both of the adjusting screws will cause a loss of contact at one point of the three between the comprising members and/or will cause a neutral condition to exist between an adjusting screw and its flange, with a resultant and subsequent change of headlamp alignment becoming very probable.

4. In many instances when a headlamp using the ball-and-socket type of mounting is being adjusted for correct alignment, due to a binding condition frequently existing between the two members comprising the ball and socket, one or the other of the flanges engaging the adjusting screws will bend severely inwardly to such an extent as to change the normal contact of the screw and the slot in the flange, thereby creating an unstable condition of the headlamp mounting, with subsequent change of headlamp alignment becoming very possible.

5. In almost every instance where a headlamp is being removed for replacement in the ball-and-socket type of mounting in which mounting the outer end of the coil spring pulling together the two members comprising the ball and socket directly engages the periphery of the retaining ring, this operation will change the vertical and/or the horizontal alignment of the headlamp.

6. In many instances when a headlamp is being removed for replacement in the ball-and-socket type of mounting, one who is not familiar with headlamp-mounting mechanisms will at first erroneously turn the vertical adjusting screw and/or the horizontal adjusting screw because of their proximity to the retaining ring screws, thereby changing the headlamp alignment.

Severe mechanical binding between members of the ball-and-socket type of headlamp mounting, which very frequently exists, often causes one or both of the adjusting screw flanges to bend when the adjusting screws are turned inwardly (which turning very much increases the tension of the coil spring), sometimes to the extent that a screw leaves the slot in the flange. During this bending of the flange there is little or no desired movement of the headlamp-mounting ring assembly. To make possible correct headlamp alignment under this condition, it is necessary to bend the flange back to its normal position and then to reinforce it by welding at the place of bending.

Mechanical binding between members of the ball-and-socket type of headlamp mounting is the cause of another problem which arises for those aligning headlamps. It has been found that sometimes when one or the other of the adjusting screws is being turned in a direction which increases tension of the coil spring, the flange will bend temporarily, with little or no movement of the headlamp-mounting ring assembly, after which a continued turning of the screw will cause the assembly to suddenly move very much in the desired direction but far beyond the desired stopping position. It is then necessary to start anew the entire aligning operation by reversing the turnings of the adjusting screws to deliberately cause a condition of severe misalignment vertically and horizontally. In some cases it becomes impossible to secure correct alignment both vertically and horizontally.

In the case of the conventional ball-and-socket type of headlamp-mounting system wherein there is a three-point contact between the two parts which form the ball and socket, it has been found that, in a relatively great number of instances, the turning inwardly of either one or the other of the adjusting screws will cause an observable circumferential movement of the headlamp-mounting ring assembly. This movement is always in a direction which causes the slots in the flanges to move away from their respective adjusting screws; and many times it is so great as to cause one or both of the adjusting screws to be on the verge of loss of contact with the flange.

In the case of the conventional ball-and-socket type of headlamp-mounting system, wherein a condition of binding between the two parts which form the ball and socket frequently exists and/or wherein a condition of loose contact between the double-head adjusting screws and the mounting ring flanges often exists, the final turnings of the adjusting screws should always be made in a direction which increases the tension of the coil spring holding together the ball and socket. If this is not done, a subsequent change of alignment is probable with ordinary vehicle use. Although certain automotive shop manuals have emphasized for many years the importance of this practice, experience has shown that it is usually not adhered to in the aiming of headlamps.

In the case of the conventional ball-and-socket type of headlamp-mounting system, it has been found that the incidence of misaligned headlamps on new vehicles delivered to the dealers and also finally to the customers is relatively very high. Although the methods used to align headlamps on the assembly lines vary with the manufacturers, no method is sufficiently reliable to preclude the necessity for the dealer to examine the headlamps for correct alignment during the new vehicle preparation by the dealer.

It is an object of the present invention to provide a headlamp-mounting system which is completely efficacious. The present invention overcomes the disadvantages of conventional headlamp-mounting systems; and it provides a positive, reliable means whereby headlamp alignment can be controlled.

Another object of the present invention is to provide a headlamp-mounting system which prevents a change in vertical and/or horizontal headlamp alignment during ordinary conditions of vehicle use.

Still another object of the present invention is to provide a headlamp-mounting system wherein the headlamp-retaining ring means of release precludes the possibility of a change in vertical and/or horizontal headlamp alignment after a headlamp has been replaced.

Yet another object of the present invention is to provide a headlamp-mounting system wherein the means for attaching the headlamp-retaining ring is separate and distinct from the means used for aligning the headlamp.

Another object of the present invention is to provide a headlamp-mounting system which precludes the possibility of a binding condition between the movable members.

Still another object of the present invention is to provide a headlamp-mounting system by which a much more nearly correct vertical and horizontal headlamp alignment can be easily accomplished when the headlamp is attached to the vehicle on the assembly line than with other systems.

Yet another object of the present invention is to provide a headlamp-mounting system with a subassembly consisting of a mounting ring, a headlamp, a retaining ring, and their ancillary parts, which subassembly can be attached to the vehicle on the assembly line in less time than is now required for the same operation in any other system.

Another object of the present invention is to provide a headlamp-mounting system in which there is no circumferential movement of the headlamp-mounting ring assembly whenever one or the other of the adjusting screws is turned for alignment.

Still another object of the present invention is to provide a headlamp-mounting system which precludes the necessity for the final turns of the adjusting screws to be made in a direction which increases the tension of the coil spring during the aligning process.

Yet another object of the present invention is to provide a headlamp-mounting system in which, in many cases of minor damage to a headlamp assembly mechanism, temporary repairs sufficient to produce a usable condition of headlamp alignment can be made more readily than with known systems.

Still another object of the present invention is to provide a headlamp-mounting system which affords a reduction in material as compared to conventional systems.

Other objects, aspects, and advantages of the present invention will become apparent from a consideration of the accompanying disclosure, drawings, and claims.

Figure 1A:
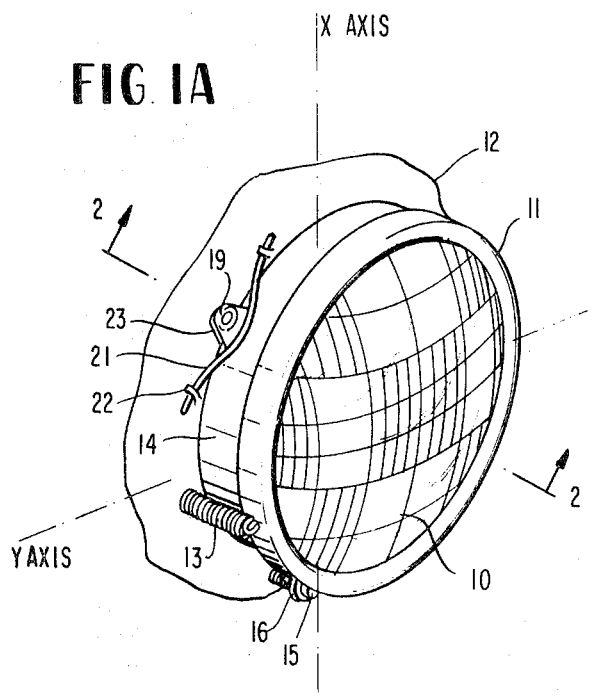
FIGS. 1A and 1B are perspective views of the improved mounting means of the present invention adapted to a conventional automotive headlamp-mounting plate.
Figure 1B:
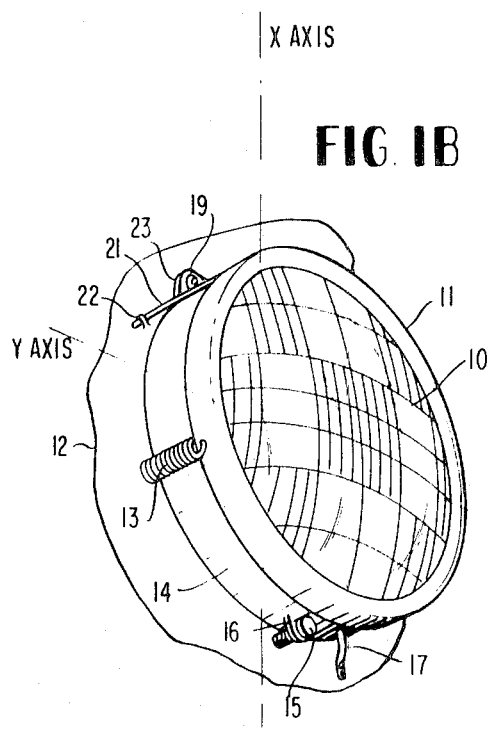

Referring now to FIGS. 1A and 1B of the drawing, an embodiment of the present invention as applied to the prototype is seen in perspective view. With a minimum number of part changes required, the mounting means of the present invention has been adapted to fit the conventional headlamp-mounting assembly found in present day automobiles. That is, the embodiment illustrated in FIGS. 1A and 1B represents an adaption of the present invention to a conventional ball and socket headlamp assembly, wherein the ball and socket is rendered nonfunctional by the mounting means taught herein. A conventional sealed beam headlamp 10 is held in place by retaining ring 11 which, in turn, is urged toward mounting plate 12 by two or more tension springs shown typically by reference numeral 13. Springs 13 are made fast to mounting plate 12 and engage respective eyelets in retaining ring 11.

With further reference to FIGS. 1A and 1B, headlamp 10 is adapted to engage mounting ring 14, an annular member which is intermediate between headlamp 10 and mounting plate 12. Adjusting screw 15, one of two such screws provided herein, engages tab 16 on mounting ring 14 and bottoms against mounting plate 12 for adjusting alignment of headlamp 10. Guide pin 17, one of the key elements of the present invention, is a member of substantially cylindrical shape which can be made fast to mounting plate 12 or can be integrally formed during stamping of mounting plate 12. The function of guide pin 17 is to control movement of mounting ring 14 in response to rotation of adjusting screws 15. Guide pin 17 engages a slot in mounting ring 14, the width of the slot being approximately the same as the diameter of guide pin 17. Mounting ring 14 is thus restrained from circumferential movement while still being free to pivot about the axis of guide pin 17 in response to turning of adjusting screws 15.

Figure 2:
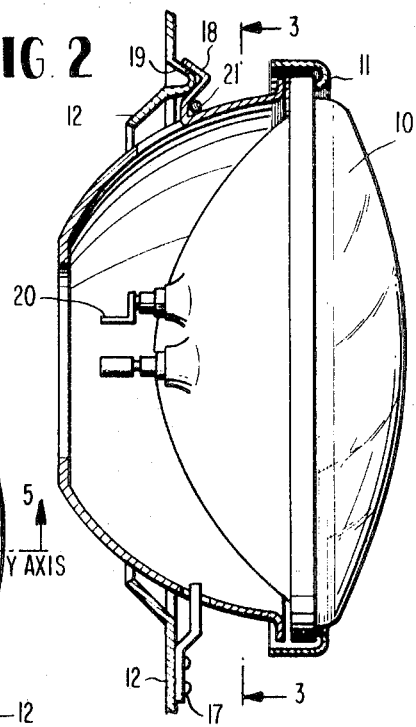
FIG. 2 is a vertical section view taken along lines 2—2 of FIG. 1A.

Referring now to FIG. 2 of the drawing, both the upper and lower elements of the pivotal mounting means of the present invention can be seen. The upper contact means, essential to the present invention, comprises conical socket 18, which is formed in mounting ring 14, and stud 19, which is part of mounting plate 12. This upper contact means cooperates with guide pin 17 to afford controlled and accurate alignment of mounting ring 14 with respect to mounting plate 12. Thus, headlamp 10 can be accurately directed to the desired setting because it is responsive to the positioning of mounting ring 14. Electrical terminals for headlamp 10 are indicated typically by reference numeral 20.

Figure 3:
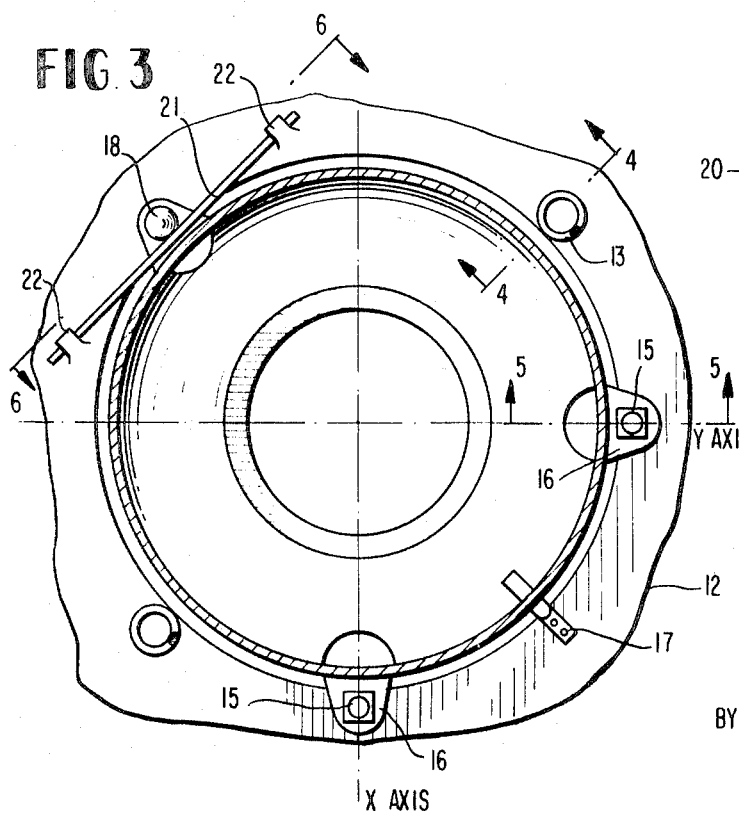
FIG. 3 is a fragmentary front view of the mounting plate taken along lines 3—3 of FIG. 2.

FIG. 3 illustrates the means by which mounting ring 14 is retained against mounting plate 12 at the upper contact point, i.e., at socket 18. Retention is afforded by means of transverse spring wire 21 which passes over ear 23 of mounting ring 14 and is retained by tabs 22 in mounting plate 12. Reference to FIG. 2 will show transverse wire 21 in relation to socket 18 for illustration of the manner in which mounting ring 14 is urged against mounting plate 12.

Figure 4:
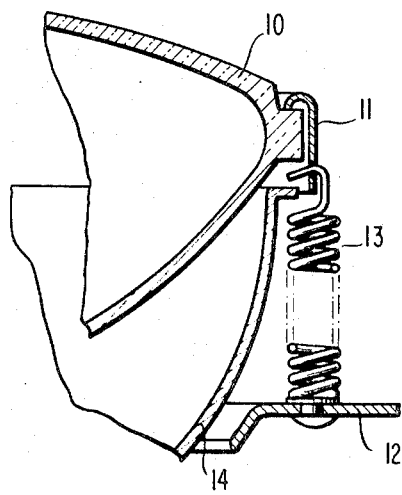
FIG. 4 is a fragmentary section view taken along lines 4—4 of FIG. 3.

FIG. 4 shows the manner in which headlamp 10 is positioned by retaining ring 11. Tension spring 13 engages mounting plate 12 on one end and retaining ring 11 on the other end. Retaining ring 11 has a U-shaped section to provide firm engagement with the periphery of headlamp 10.

Figure 5:
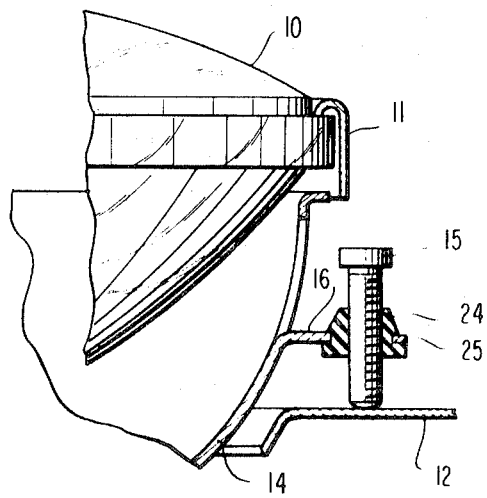
FIG. 5 is a fragmentary section view taken along lines 5—5 of FIG. 3.

Referring now to FIG. 5, the mounting details of adjusting screw 15 are illustrated. To maintain a given setting on adjusting screw 15, friction member 24 is provided within ring section 25 of tab 16. Friction member 24, of square design, serves to lock-adjusting screw 15 and can be made from a material such as nylon or a tetrafluoroethylene polymer.

Figure 6:
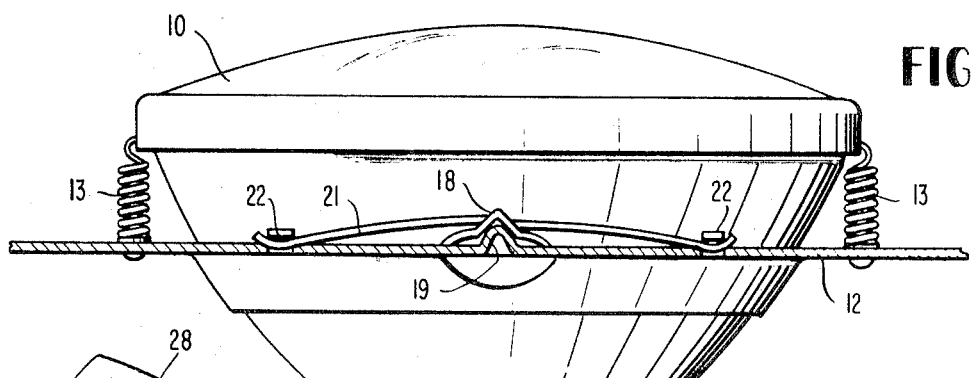
FIG. 6 is a bottom view taken along lines 6—6 of FIG. 3.

FIG. 6 illustrates in a bottom view the manner in which transverse wire 21 cooperates with tabs 22 to urge socket 17 of mounting ring 14 against stud 19 of mounting plate 12. The movement of socket 18 with respect to stud 19 provides the freedom of adjustment necessary to attain the desired alignment of headlamp 10 for proper road illumination of the vehicle to which this headlamp-mounting means is affixed.

As hereinbefore described, the embodiment of the present invention illustrated in FIGS. 1 through 6 above represents a configuration of the prototype wherein the mounting means taught herein is adapted to the conventional headlamp mounting assembly found in almost all of today's automotive vehicles.

Figure 7:
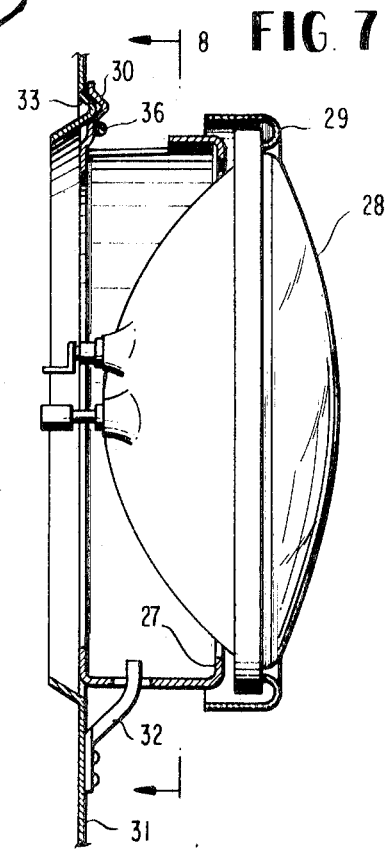
FIG. 7 is a vertical section view of a preferred embodiment of the present invention.

FIG. 7 of the drawing illustrates a preferred embodiment of the present invention wherein the mounting ring and mounting plate are especially constructed to accommodate the mounting means taught by the present invention. With reference now to FIG. 7, the mounting ring is identified by reference numeral 26. Mounting ring 26 is a cylindrical member having flanges on either end shown typically by reference numeral 27. Headlamp 28 is disposed against flange 27 and is held fast thereon by retaining ring 29. On the inboard end of mounting ring 26 is affixed socket 30. Socket 30 may be integrally formed in the manufacture of mounting ring 26; or it can be formed separately and made fast to mounting ring 26. Socket 30 can be any of a number of shapes, the illustrated embodiment being substantially conical. Mounting plate 31 is preferably a stamping which can comprise a body panel or fender portion of the vehicle to which the headlamp is to be mounted. Guide pin 32 can be made fast to mounting plate 31 by any suitable means. Stud member 33, which cooperates with socket 30, is formed during the fabrication of mounting plate 31. In the embodiment illustrated in FIG. 7, therefore, the improved mounting means of the present invention is achieved with a minimum number of newly constructed components. In comparison with the conventional ball-and-socket headlamp-mounting system found in current vehicles, the embodiment of FIG. 7 affords a simpler construction with a substantial reduction in the amount of metal required.

Figure 8:
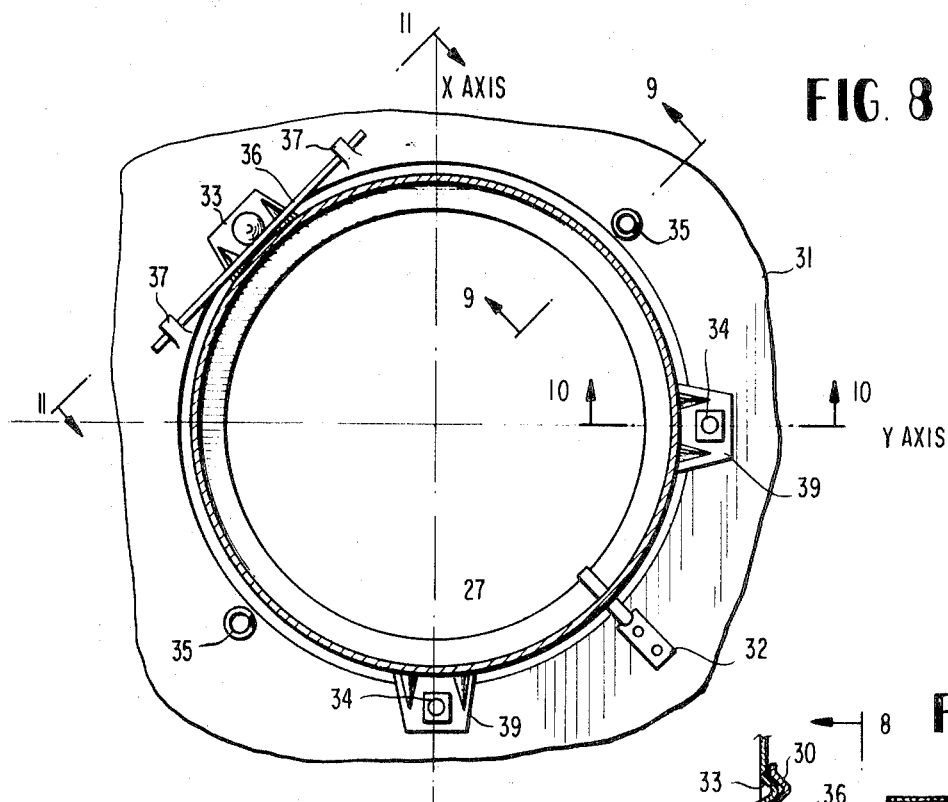
FIG. 8 is a fragmentary front view of the preferred mounting plate taken along lines 8—8 of FIG. 7.

FIG. 8 shows the component of mounting plate 31, including headlamp-adjusting screw 34 and tension springs 35, the latter being engageable with headlamp-retaining ring 29 to hold headlamp 28 against the pivotable alignment mechanism taught herein. Transverse wire 36 compresses the members of the upper contact means, said wire being retained by tabs 37 in mounting plate 31.

Figure 11:
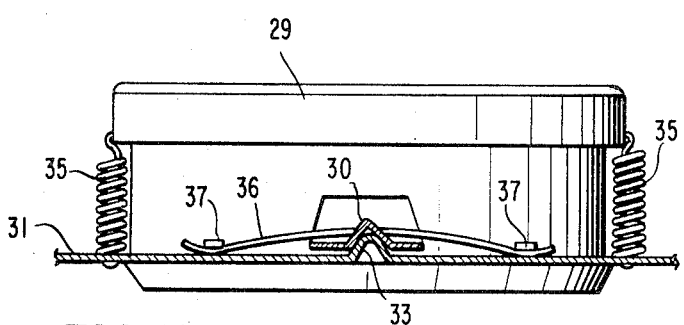
FIG. 11 is a bottom view taken along lines 11—11 of FIG. 8.

FIG. 11 illustrates in a bottom view the manner in which transverse wire 36 cooperates with tabs 37 to urge socket 30 of mounting ring 26 against stud 33 of mounting plate 31.

Figures 9, 10:
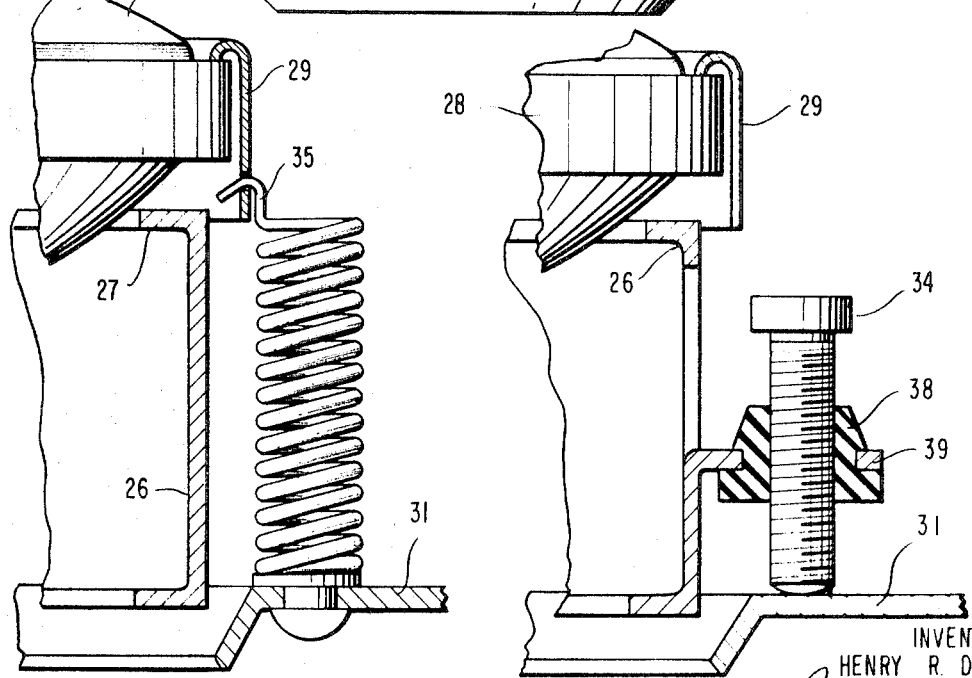
FIG. 9 is a fragmentary section view taken along lines 9—9 of FIG. 8.
FIG. 10 is a fragmentary section view taken along lines 10—10 of FIG. 8.

FIG. 9 shows the manner in which headlamp 28 is positioned by retaining ring 29. One end of tension spring 35 engages a hole in retaining ring 29 and the other end is made fast to mounting plate 31. Retaining ring 29 has a U-shaped section to provide firm engagement with the periphery of headlamp 28.

Referring now to FIG. 10, the mounting details of headlamp-adjusting screw 34 are illustrated. To maintain a desired setting on adjusting screw 34, friction member 38 is provided in tab 39 of mounting ring 26. The friction of member 38 against the threads of adjusting screw 34 prevents rotational movement of adjusting screw 34 due to vehicle vibration. The bottom of adjusting screw 34 bears against mounting plate 31.

Figure 12:
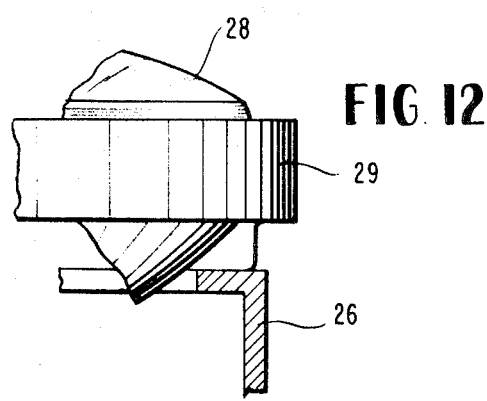
FIG. 12 is a fragmentary view illustrating seating of the headlamp.

FIG. 12 shows a detailed view of the actual contact between headlamp 28 and mounting ring 26. Contact is made against the flat surface of a plurality of seating lugs which are formed near the periphery of headlamp 28 during the glass-molding operation.

Referring again to FIG. 7 of the drawing, guide pin 32 penetrates a narrow slot in the wall of mounting ring 26. As the adjusting screws are turned to attain the correct alignment of headlamp 28, socket 30 moves with respect to stud 33. This alignment system is positive in its action and is not susceptible to changes as a result of vehicle vibration. There is thus provided by the present invention a positive and stable means of maintaining the correct alignment of a vehicular headlamp, which overcomes the difficulties experienced with prior art mounting mechanisms. It will be observed that the only screws which are included in the instant mounting device are those which affect headlamp alignment. There are no retaining screws accessible to a mechanic which might be confused with the adjusting screws. That is, two or three springs are employed to hold the retaining ring as opposed to two or three retaining ring screws of prior art devices which have been confused with the adjusting screws therein.

It has been found that the contact means of the present invention is not susceptible to the binding condition which has occurred with the conventional ball-and-socket contact system found in present day automotive headlamp-mounting systems.

While this invention has been described with respect to certain specific embodiments, it is not so limited, and it is to be understood that variations and modifications thereof may be made without departing from the spirit or scope of the following claims.

The embodiments of this invention in which an exclusive property or privilege is claimed are defined as follows:

1. Headlamp-mounting apparatus comprising, in combination, a mounting plate having a guide member and a stud member substantially opposed diametrically, an intermediate support member having a socket adapted to engage said stud member and an aperture adapted to receive said guide member, holding means adapted to maintain said socket in contiguity with said stud member, a headlamp in juxtaposition with said intermediate support member, headlamp-retaining means engaging said headlamp, resilient means adapted to urge said headlamp-retaining means toward said mounting plate, and alignment means cooperating with said intermediate support member and in contact with said mounting plate, said alignment means adapted to position said intermediate support member with respect to said mounting plate through the pivotal action of said socket about said stud member.

2. An apparatus of claim 1 wherein said aperture in said intermediate support member cooperates with said guide member to restrain circumferential travel of said intermediate support member.

3. An apparatus of claim 1 wherein said holding means comprises a transverse spring adjacent said socket and secured to said mounting plate.

4. An apparatus of claim 1 wherein said resilient means comprises a plurality of tension springs.

5. An apparatus of claim 1 wherein said alignment means comprises two adjusting screws separated about 90° circumferentially and equidistant from said guide member.

6. An apparatus of claim 5 wherein said screws adjustably engage a friction member affixed to said intermediate support member.

7. An apparatus of claim 1 wherein said socket is substantially conical.

8. An apparatus of claim 1 wherein said stud member is substantially spherical.

9. An apparatus of claim 1 wherein said guide member is substantially cylindrical.

* * * * *